United States Patent [19]
Wang

[11] Patent Number: 5,776,532
[45] Date of Patent: Jul. 7, 1998

[54] BAKING METHOD AND ASSOCIATED APPARATUS

[76] Inventor: Ping Wang, 420 Mills Dr., Benicia, Calif. 94510

[21] Appl. No.: 681,113

[22] Filed: Jul. 22, 1996

[51] Int. Cl.⁶ ..................................................... A23L 1/10
[52] U.S. Cl. ..................... 426/511; 426/506; 426/505; 426/498; 99/324; 99/339; 99/422
[58] Field of Search ..................... 99/324, 339, 422; 426/505, 498, 506, 511

[56] References Cited

U.S. PATENT DOCUMENTS

| | | |
|---|---|---|
| 3,612,036 | 10/1971 | Kaufman . |
| 3,735,749 | 5/1973 | Binks et al. . |
| 3,794,016 | 2/1974 | Binks et al. ........................... 126/369 |
| 3,889,582 | 6/1975 | Binks et al. . |
| 3,946,893 | 3/1976 | Bowersmith . |
| 3,972,318 | 8/1976 | Lenoir ...................................... 126/348 |
| 4,092,909 | 6/1978 | Phillips ..................................... 99/444 |
| 4,167,233 | 9/1979 | Hare . |
| 4,644,858 | 2/1987 | Liotto et al. . |
| 4,676,151 | 6/1987 | Gorsuch et al. . |
| 5,012,947 | 5/1991 | Roland . |
| 5,503,063 | 4/1996 | Sebald ..................................... 99/447 |
| 5,680,956 | 10/1997 | Woodward et al. .................... 220/607 |

*Primary Examiner*—Jeffrey Stucker
*Attorney, Agent, or Firm*—R. Neil Sudol; Henry D. Coleman

[57] ABSTRACT

In a baking method, a piece of dough is deposited on a substantially horizontal support surface provided with at least one perforation so that the piece of dough covers the perforation. The surface together with the piece of dough are moved into a heated enclosure, wherein the surface and the piece of dough are maintained for a predetermined period of time. During at least a portion of that period, steam is fed through the perforation so that at least some of the steam enters the piece of dough through a lower surface thereof. This method is implementable in a batch type baking process or a continuous conveyor process.

30 Claims, 5 Drawing Sheets

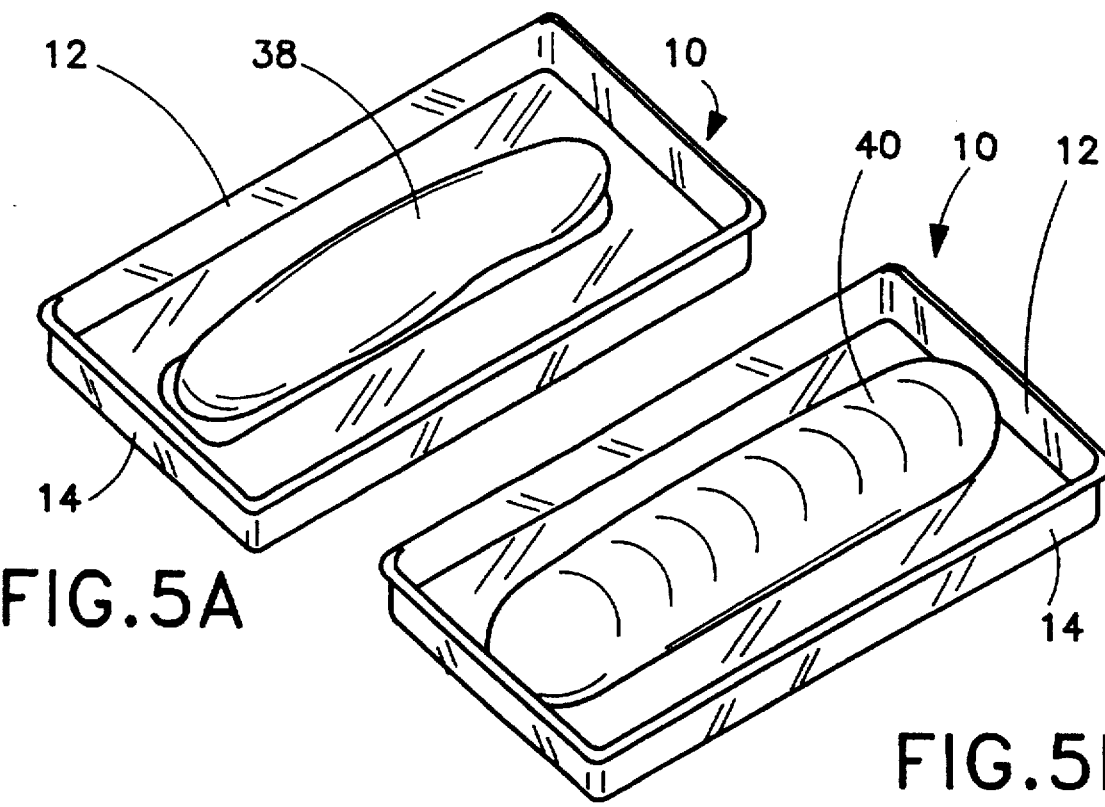
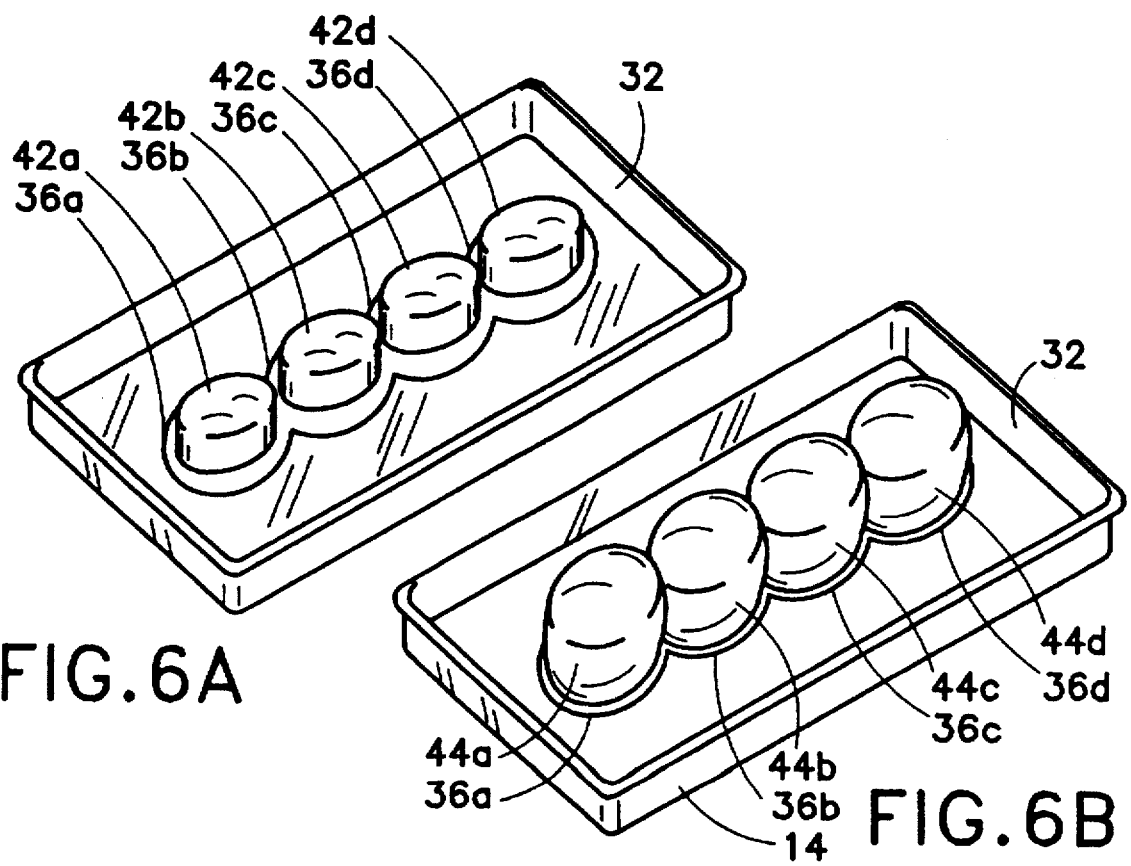

BAKING METHOD AND ASSOCIATED APPARATUS

BACKGROUND OF THE INVENTION

This invention relates to a method for baking bread, rolls and related foodstuffs from lumps of dough. This invention also relates to a baking pan useful in performing the method.

Bread and baked dough products are among the most popular foods in the western world and have been increasingly popular in Asia. Being able to manipulate the quality of a baked dough product is a major challenge and an extremely important task to the food industry. The final quality of a baked dough product is determined by its texture, color and flavor profile.

The baking of a baked dough product involves the development of a pre-proofed (either yeast or chemical leavened) dough to a desired raw specific volume, shaping the dough to a pre-determined geometry and weight, placing the dough on (or in) a baking pan, and then baking at a constant temperature (350°–380° F.) for a period of time until the surface of the dough reaches a golden brown color.

Traditional metal baking pans or sheets suffer several disadvantages when used for baking bread (especially French bread) and other baked dough products. Due to the difference in the heat transfer rate between the bottom surface of the dough and the rest of the dough, the bottom layer (or crust) of the baked product is normally overheated so that the color is darker than the desired golden brown. In addition, the bottom surface of the baked product has an undesired burned flavor which has developed by the time the top surface turns golden brown.

Traditionally, the final baked specific volume of a baked dough product usually does not reach the maximum attainable volume due to the crust formation that restricts the volume expansion of the interior region. The volume expansion and crust formation are controlled by the heat and mass transfer characteristics of the baking process. Therefore, the baked specific volume is significantly affected by the baking parameters such as oven temperature and air velocity. Since the texture property of a baked dough product is strongly dependent upon the baked specific volume, it is necessary to control and unify the baked specific volume. Under most baking conditions, it is often desirable to have a baked specific volume that is as large as possible.

The texture property of a baked dough product is determined by not only the baked specific volume but also the homogeneity of the pore size distribution. It has been known that the pore size distribution is affected by the simultaneous heat and mass transfer during baking. Sometimes extremely large holes, at the consumption of many small holes, are developed in a baked dough product. In this situation, even though the baked specific volume is large enough, the overall quality of the baked dough product can be quite low.

The phenomenon of burgeon is very common in a baked dough product. Burgeon is related to (1) differences in the rate of crust formation and the rate of heat transfer to the interior of a baked dough product; and (2) the thickness and toughness of the crust. Under most baking conditions, the crust has been developed before the center (interior) reaches the starch gelatinization temperature because of thermal lag. If the crust is strong or the crust has a high elastic module, it will restrict additional volume expansion even when the center temperature is increased, thereby resulting in a low baked specific volume as mentioned in a previous paragraph. The additional volume expansion from the interior region when the temperature is further increased can break the crust when there is a weak point on the crust. Burgeon would cause irregular and undesired shapes of a baked dough product.

Since the baking time is normally determined by the color of the surface, it is possible to have an undercooked region near the geometric center of a baked dough product when (1) the oven temperature and air velocity are set too high and (2) the dough geometry and size are not appropriated controlled. The doughy interior would result in a low baked specific volume because the interior has not been properly baked (cooked) with a resulting undesired texture property of the finished product.

The flavor profile also plays a very important role in determining the final quality of a baked dough product. In order to enhance and manipulate the flavor of a baked dough product, one or more flavor compounds are commonly added into the dough during mixing. However, being able to manipulate the flavor of a pre-mixed refrigerate dough product or frozen dough product is not an easy task.

OBJECTS OF THE INVENTION

An object of the present invention is to provide a baking method which results in a larger baked product with the same raw specific volume.

Another object of the present invention is to provide a baking method which produces a baked product having a more even degree of crust browning.

A further object of the present invention is to provide a baking method wherein burgeon is reduced.

An additional object of the present invention is to provide a baking method wherein the interiors of the baked products are more likely to be soft and fluffy and properly cooked, rather than undercooked.

Yet another object of the present invention is to provide a new baking pan for use in carrying out the method of the invention.

A supplemental object of the present invention is to provide a continuous baking oven for implementing the method of the invention.

These and other objects of the present invention will be apparent from the descriptions and illustrations provided herein.

BRIEF DESCRIPTION

A baking method comprises, in accordance with one embodiment of the present invention, (1) depositing a piece of dough on a substantially horizontal support surface provided with at least one perforation, the piece of dough covering the perforation, (2) moving the surface together with the piece of dough into a heated enclosure, (3) maintaining the surface and the piece of dough in the enclosure for a predetermined period of time, and (4) during at least a portion of the predetermined period, feeding steam through the perforation so that at least some of the steam enters the piece of dough through a lower surface thereof.

This method serves to produce a moister, fresher tasting bread product. The steam fed to the interior of the dough assists in the cooking of piece of dough along the inside thereof. The crust is still formed, but the center is moister.

Preferably, the support surface is provided with a plurality of perforations in an array conforming substantially to the desired shape and size of the baked product. Thus, where the baked product is a loaf of bread, the array of perforations is elongated. Where the baked product is a roll, the array of perforations is generally circular or oval.

The perforations are small so that dough does not fall into the perforations. Moreover, the smallness of the perforations facilitates the generation of steam pressure in a chamber below the support surface and increases the velocity of the steam entering the dough through the perforations. The higher velocity in turn increases the distance that the steam can penetrate into the dough.

The steam enhances the raising or expansion of the dough by heating the air and carbon dioxide in the dough and also by converting moisture in the dough to water vapor. The solid portions of the dough itself also expand due to the internal heating.

The piece of dough is deposited on the support surface so as to cover all of the perforations. Inevitably, some water vapor escapes from beneath the piece of dough and moistens lateral surfaces of the dough, particularly along approximately the lower quarter of the dough's height. This water vapor is not visible to the naked eye but can be detected, for example, by placing a mirrored surface close to the dough. The steam and water vapor thus maintain the lowermost surfaces of the dough in a moist condition and thereby allows them to stretch during the initial baking phase (approximately ten minutes or one-third of the total baking time). This contributes to a larger baked product. The moisture applied to the lower surfaces of the dough through the perforations enables expansion of the entire piece of dough by feeding dough from the interior of the dough to the lower surfaces thereof.

The method of the instant invention may be implemented in a continuous baking process. In that case, the support surface is part of an endless belt which is moved continuously through the enclosure from an entrance to an exit thereof. The belt divides the enclosure into an upper chamber and a lower chamber, with steam being generated only in the lower chamber.

In a batch type baking process, the support surface is on an upper panel of a baking pan having a substantially sealed chamber communicating with the perforation. The method then further comprises placing a predetermined amount of water into the chamber prior to the moving of the support surface and the piece of dough into the enclosure. The steam is generated from the water after placement of the baking pan and the piece of dough into the enclosure. The amount of water is controlled so that the steam generating phase last approximately ten minutes or one-third of the total baking time.

In accordance with another feature of the invention, the baked product may be provided with enhanced or supplemental flavoring by placing a flavoring composition into the chamber of the baking pan prior to the moving of the pan and the piece of dough into the baking enclosure (oven) Where the baking pan is provided in a lower panel with a recess communicating with the chamber, the flavoring composition may be placed in the recess. The flavoring composition may include a flavoring agent dispersed or dissolved in water or a cooking oil. Alternatively, the flavoring agent may be placed in the respective recess in powered form.

Where the baking pan is provided in the lower panel with at least one recess communicating with the chamber, water may be placed in the recess. The recess may have a preestablished size, thereby determining the amount of water introduced into the baking pan chamber, where the recess is filled to the top or to a "fill line." Different recesses may be provided in the lower panel of the baking pan for separately receiving the flavoring composition and the predetermined aliquot of water for the generation of steam during the baking process.

A baking pan comprises, in accordance with a general embodiment of the present invention, an upper panel defining a substantially horizontal support surface provided with a plurality of perforations disposed in an array covering only a portion of the support surface. The support surface has an area surrounding the perforation array which is continuous and free of perforations. The baking pan further comprises a lower panel, and means for releasably and sealingly coupling the upper panel and the lower panel to one another so as to define a steam generation chamber therebetween. The lower panel is provided with a recess communicating with the chamber. The perforations in the upper panel also communicate with the chamber.

The array preferably approximates, in size and shape, a lower surface of a loaf of bread or other baked product such as a roll.

In accordance with another feature of the present invention, the horizontal surface of the upper panel includes a raised portion, the perforations being disposed in the raised portion. More specifically, the raised portion includes a central depression, with the perforations being disposed in the depression.

In a specific embodiment of the present invention, the water-receiving recess is laterally spaced from the array of perforations. The upper panel and the lower panel define the steam generating chamber to include a channel between the water-receiving recess and the perforations. This enables a superheating of the steam prior to ejection thereof through the perforations into the dough.

A continuous-type baking oven comprises, in accordance with another embodiment of the present invention, an enclosure having an entrance opening and an exit opening, and a conveyor belt extending through the enclosure from the entrance opening to the exit opening. The conveyor surface is provided with a multiplicity of perforations arranged in a plurality of spaced arrays. The enclosure has a baking chamber defined along a lower boundary by the belt. Steaming elements are provided for generating steam in the enclosure continuously along a predetermined distance under the belt.

Compartmentalization componentry may be provided in the continuous baking oven for operatively dividing the baking chamber into a steam-containing first baking zone and an essentially steam-free second baking zone, the second baking zone being disposed downstream of the first baking zone.

Preferably, the first baking zone communicates with at least some of the perforations, whereby the first baking zone is provided with steam from the steaming means, The present invention provides a new baking pan that can be used by consumers in household ovens, at pastry shops and small bakeries in commercial ovens and large bakeries in continuous baking tunnels for baking of bread, biscuits, rolls, muffin, cookies and other baked dough products. The new baking pan offers the following advantages in terms of the quality of a baked dough product over the conventional metal baking pans and sheets.

(1) higher baked specific volume, there is a 5–30% increase in the baked specific volume of a finished product depending on the formulation; for French bread, the baked specific volume obtained using a new baking pan is roughly 20–25% higher than that of a conventional baking pan.

(2) more uniform pore size distribution; extreme large pores can be avoided when the new baking pan is used.

(3) a more uniform, stable and reproducible shape and appearance; burgeon can also be avoided by using the new baking pan.

(4) more uniform color distribution of the crust; excess crust and dark brown color formation at the bottom crust can be avoided.

(5) less sensitive to the baking parameters such as the oven temperature and air velocity; the undercooked region can be avoided when the oven temperature is unintentionally set too high using the new baking pan.

(6) a different but better and more desirable flavor profile; also, any desired finished flavor profile may be obtained from the same recipe of dough.

(7) softer interior structure of a baked dough product, due to the higher moisture (2-3% higher) of the interior, the baked dough product baked with the new baking pan would be softer and fresher than that of the conventional baking pan; the baked dough product is fully expanded, upraised well and the bread crumb is softer and fluffier.

(8) a 20-100% increase in shelf life for the similar product quality.

A baking pan in accordance with the present invention preferably consists of two pieces, combines the effects and advantages of steaming and baking to optimize and control the baking of baked dough products such as bread, buns, rolls, biscuits and etc. so that higher product qualities and special effects can be achieved. The interior of a finished baked dough product is soft, fluffy and moisture while the crust is crispy. It can be applied to any product that requires soft and moist interior and crispy crust. By introducing appropriate flavor agents (water or oil soluble) in the flavor chamber of the baking pan during baking, the flavor profiles of a finished product can be easily manipulated. It can be used in household electrical and gas ovens as well as industrial baking tunnels.

The baking pan is provided in a lower plate with grooved water and flavor channels (volume, pattern and depth are product dependent). The bottom is designed to be able to absorb heat from a oven as soon as possible to vaporize water. It can be made of aluminum, stainless steel, copper or alloys. The upper plate, on which the dough products will be placed, is perforated and is made of stainless steel or a non-sticky metal. The patterns and holes (size, shape, geometry) and of the perforation depend upon the type of dough product. There several possible mechanisms to couple the bottom and upper plates, for instance, by inserting the upper plate into the grooves of the bottom plate of by simply clamping the upper plate onto the bottom plate.

A known amount of water is added into the grooved water channels before usage. The channels may be provided with depth or dosage markers to indicate desired water volume. The amount of water is product and load dependent. A desired flavor agent (liquid or powder either in bags or small aluminum pans) is placed in the flavoring chamber. The upper and bottom plates are then combined. The assembly of the baking pan may or may not require pre-heating. Besides baking, the pan can also be used in:

1. roasting; the bottom plate can hold the drips.
2. steaming and baking of vegetables.
3. steaming; to be used with a transparent cover made of CORNNG™ ware.
4. cooking; to be used on stoves directly.
5. defrosting and thawing; the bottom plate can hold the drips; the defrosting and thawing rate are faster since the surface area is larger.
6. regular baking; it behaves as a regular baking pan (or sheet) by introducing a non-perforated upper plate. The air gap between the upper and bottom plates reduces the heat transfer rate so that over-heating of the bottom of a baked dough product can be avoided.

Therefore, a baking pan in accordance with the invention a multi-purposed pan that can replace a majority of existing baking pans.

BRIEF DESCRIPTION OF THE DRAWINGS

FIGS. 5A and 5B are perspective views of the baking pan of FIG. 1, showing an elongate piece of dough and a corresponding baked loaf of bread, respectively, positioned on the pan.

FIGS. 6A and 6B are perspective views of the baking pan of FIG. 2, respectively showing four pieces of dough and corresponding baked rolls or buns placed on the baking pan.

DESCRIPTION OF THE PREFERRED EMBODIMENTS

Figure 1:
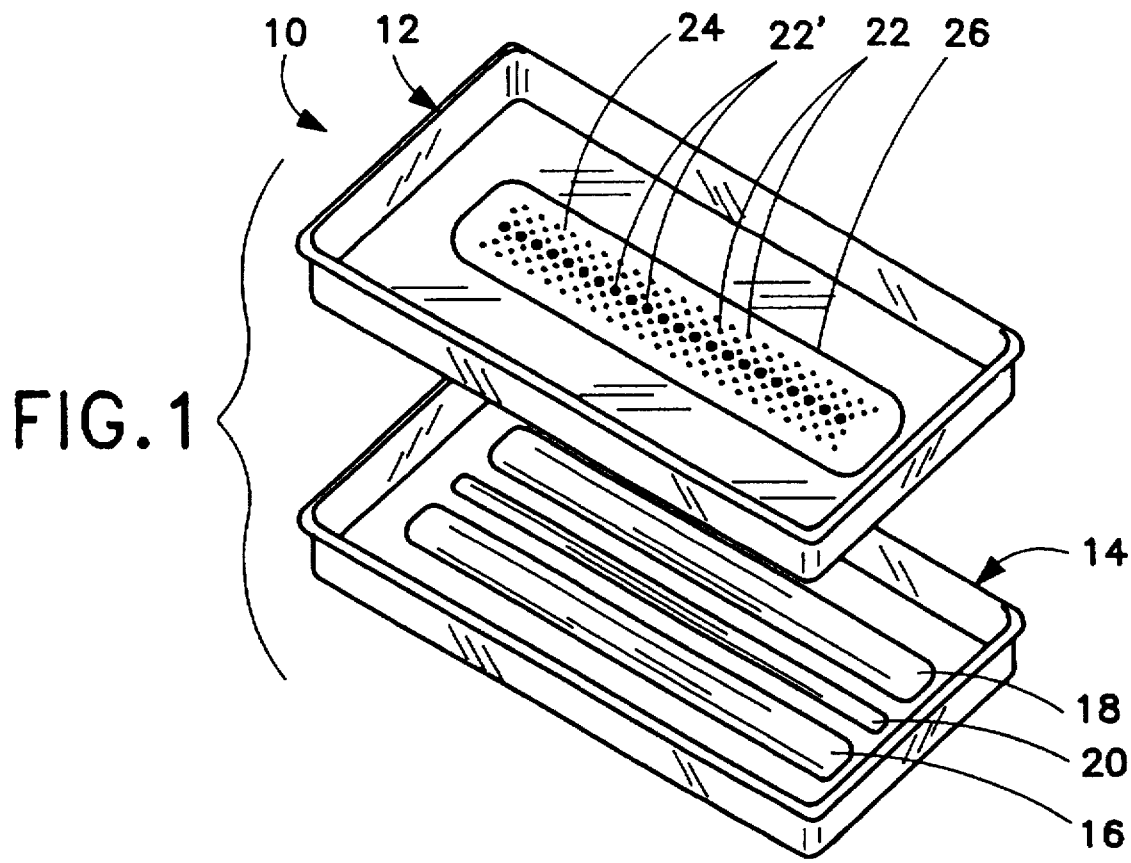
FIG. 1 is an exploded perspective view of a baking pan in accordance with the present invention, showing an upper plate and a lower plate of the baking pan.
Figure 3:
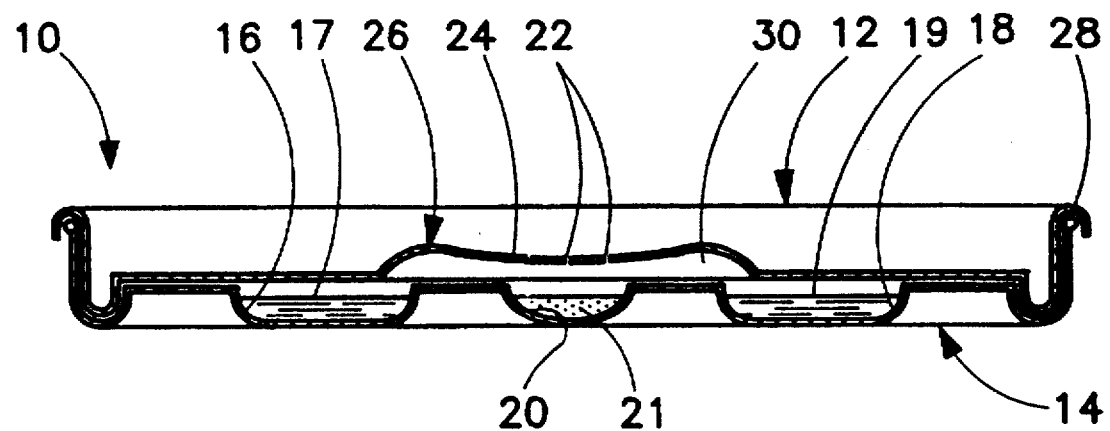
FIG. 3 is a schematic transverse cross-sectional view of the baking pan of FIG. 1, in an assembled configuration.
Figure 4:
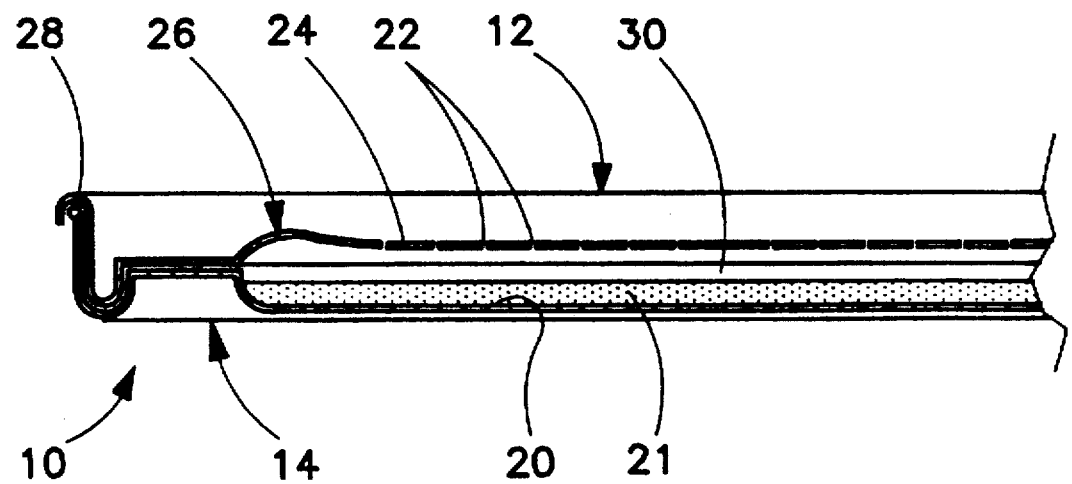
FIG. 4 is a schematic longitudinal cross-sectional view of the baking pan of FIG. 1, in an assembled configuration.

As illustrated in FIGS. 1, 3 and 4, a baking pan 10 comprises an upper panel or plate 12 and a lower panel or plate 14 Panels 12 and 14 can be made of metal such as stainless steel, aluminum, silver coated brass or non-sticky alloys. Lower panel 14 has two substantially hemispherical grooves or recesses 16 and 18 Recesses 16 and 18 receive a fixed amount of water 17, 19 (FIG. 3) before baking starts. The depths, diameters and lengths of recesses 16 and 18 may vary in accordance with the intended application, for example, the type and size of the dough product to be baked.

Lower panel 14 is also provided with an auxiliary groove or recess 20 for receiving a flavoring composition 21 (FIGS. 3 and 4) which includes a conventional flavoring agent dispersed or dissolved in water or cooking oil or provided in powder form. The flavoring composition 21 may be disposed in recess 20 in prepackaged bags or small aluminum pans (not shown).

Upper panel 12 defines a substantially horizontal baking surface provided with a multiplicity of perforations 22 disposed in an array substantially conforming in size and shape to a loaf of bread. As shown particularly in FIGS. 3 and 4, perforations 22 are disposed in an elongate depression 24 formed in an elongate raised portion 26 of upper panel 12. As further shown in FIGS. 3 and 4, upper panel 12 and lower panel 14 are releasably connected to one another along a peripheral bead-and-groove sealing coupling 28. In the assembled configuration of FIGS. 3 and 4, panels 12 and 14 define a substantially sealed steam generation chamber 30 which communicates with recesses 16, 18 and 20 on a lower side and with perforations 22 on an upper side.

Perforations 22 are mostly very small, on the order of the diameter of a ballpoint pen's writing ball. Perforations 22 must be small enough to prevent dough on upper panel 12 from falling into the perforations. Generally, as indicated in the drawings, perforations 22' in the center of the perforation array may be somewhat larger than those at the periphery, to enable a greater flow rate into the center of piece of dough.

Figure 2:
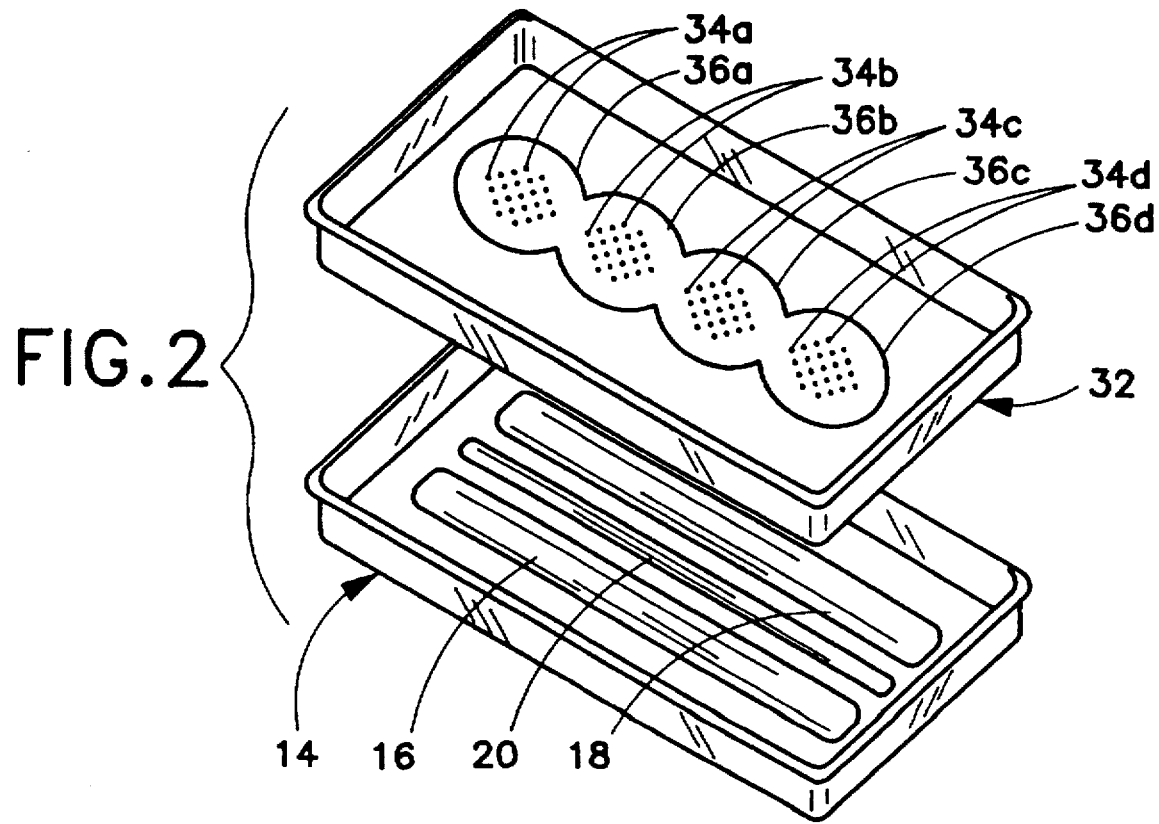
FIG. 2 is an exploded perspective view of a modified baking pan in accordance with the present invention, showing an upper plate and a lower plate similar to those shown in FIG. 1.

FIG. 2 illustrates a modification of the baking pan of FIGS. 1, 3 and 4 wherein upper panel 12 is replaced by an upper panel 32 having four disk-shaped arrays of perforations 34a, 34b, 34c, 34d disposed in a linear configuration. Perforations 34a, 34b, 34c, 34d may be provided in raised portions 36a, 36b, 36c, 36d of panel 32. Again, perforations (not designated) in the central areas of the disk-shaped perforation arrays may be slightly larger (2–3 times as large) than the perforations 36a, 36b, 36c, 36d at the peripheries.

FIGS. 5A and 5B depict two successive stages in the baking of a loaf of bread 38 from an elongate piece of dough 40. After the placement of a predetermined aliquot of water 17, 19 in recesses 16 and 18 (see FIG. 3) and, optionally, the disposition of a flavoring composition 21 in recess 20 (FIGS. 3 and 4), panels 12 and 14 are connected to one another Dough piece 40 is then positioned centrally on an upper surface (not designated) of upper panel 12 so that the dough covers essentially all of the perforations. Supporting the dough 40 on its uppermost surface, baking pan 10 is then placed into a heated enclosure or oven having a preselected temperature During an initial phase of a baking cycle, steam is generated in chamber 30 and escapes through perforations 22. Steam enters the dough through the perforations 22 and 22', thereby assisting in the cooking of the interior portion of the dough and maintaining the interior dough at an enhanced moisture level. In addition, steam bathes a lower horizontal surface (not designated) of dough 40 and water vapor leaks from between the dough and the upper panel to moisten the lower lateral surfaces of dough 40. The escaping water vapor is effective to moisten approximately the lower one-fourth of the lateral surface of dough 40. The moistening of the lower surfaces of dough 40 with steam prevents a browning or hardening of those surfaces during the initial baking phase, thereby enabling a greater degree of dough expansion.

Generally, the amount of water placed into recesses 16 and 18 is just sufficient to generate steam during approximately ten minutes (or about one-third) of a thirty minute baking process. If recesses 16 and 18 can hold a greater amount of water, fill lines (not shown) may be provided to indicate the recommended amount of water to be added for steam generation.

A second phase of the baking process begins when the water in recesses 16 and 18 has been exhausted. During that second phase, the lower surfaces of the dough 40 brown and harden. Because the heat transferred to the dough is greater at the baking pan than along the upper surfaces of the dough, the browning and hardening of the lower surfaces catches up to and substantially matches the browning and hardening of the upper surfaces by the end of the baking process. In any event, because of the delay in the baking of the lowermost, horizontal surface of the dough, that surface is lighter and softer in the final baked loaf 38, in comparison with conventional baking procedures.

FIG. 6A and 6B illustrate the use of the baking pan of FIG. 2 and show upper surfaces of raised portions 36a, 36b, 36c, 36d supporting respective lumps of dough 42a, 42b, 42c, 42d. Again, essentially all perforations 34a, 34b, 34c, and 34d are covered at the beginning of the baking process. The baking process proceeds as discussed above with reference to FIGS. 5A and 5D.

It is to be noted that in the baking pans of FIGS. 1 and 2, recesses 16 and 18 are laterally staggered with respect to raised portion 26 of panel 12 and raised portions 36a, 36b, 36c, 36d of panel 32. As best seen in FIG. 3, this relative lateral positioning forces the steam generated from water 17 and 19 to flow along a channel between heated surfaces of upper panel 12 or 32 and lower panel 14 prior to ejection via perforations 22 and 22' or 34a, 34b, 34c, 34d. The heat transfer enabled by this contact between the steam and the heated surfaces of upper panel 12 or 32 and lower panel 14 superheats the steam and enhances the improved baking process described herein, particularly for chemically leavened dough.

Figure 7A:
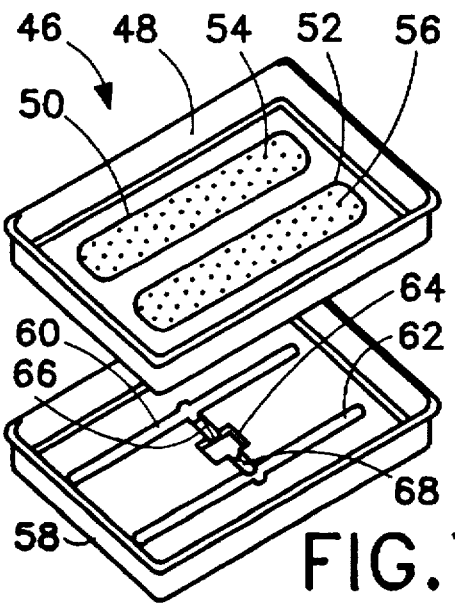
FIGS. 7A-7D show successive steps in the use of another baking pan in a baking method in accordance with the invention.
Figure 7B:
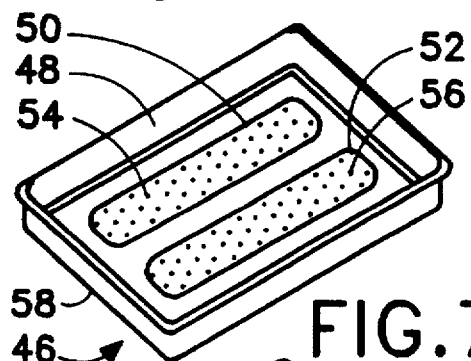
Figure 10:
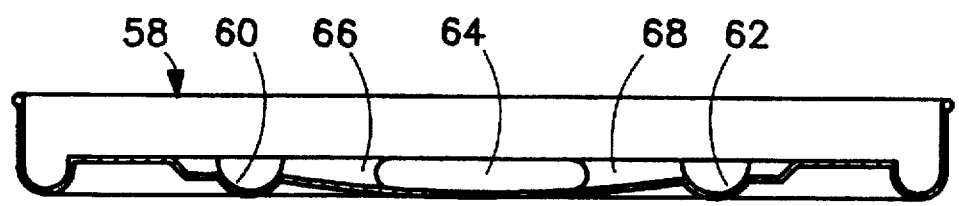
FIG. 10 is a transverse cross-sectional view of a lower panel or plate of the baking pan of FIGS. 7A-7B, taken along a geometric center line.
Figure 11:
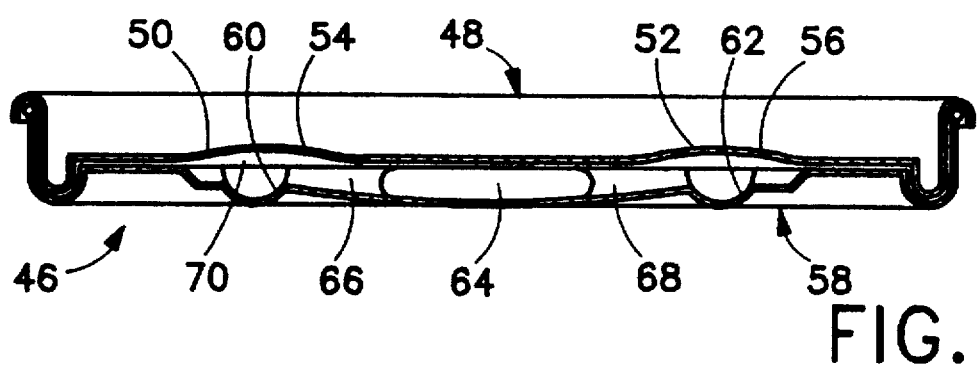
FIG. 11 is a transverse cross-sectional view of the assembled baking pan of FIGS. 7A-7B, taken along a geometric center line.

FIGS. 7A–7B illustrate successive steps in a baking process using a modified baking pan 46 which enhances the baking process for yeast leavened dough. As shown in FIGS. 7A, 7B, 9 and 11, pan 46 includes an upper panel or plate 48 having a pair of elongate raised portions 50 and 52 each provided with an elongate array of perforations 54 and 56. Pan 46 also includes a lower panel or plate 58 (FIGS. 7A, 10 and 11) having parallel water-receiving grooves or recesses 60 and 62 connected to a central flavoring-receiving recess 64 via respective channels 66 and 68. As shown in FIGS. 7A, 10 and 11, channels 66 and 68 taper from a maximum transverse cross-sectional area at recess 64 to minimum transverse cross-sectional area at recesses 60 and 62.

Figure 7C:
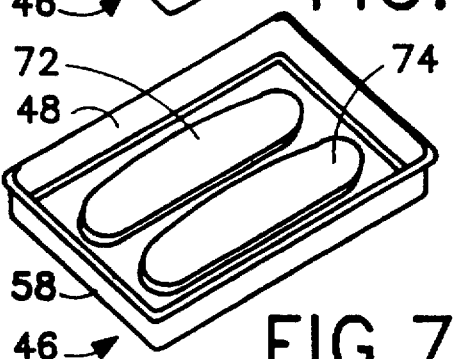
Figure 8C:
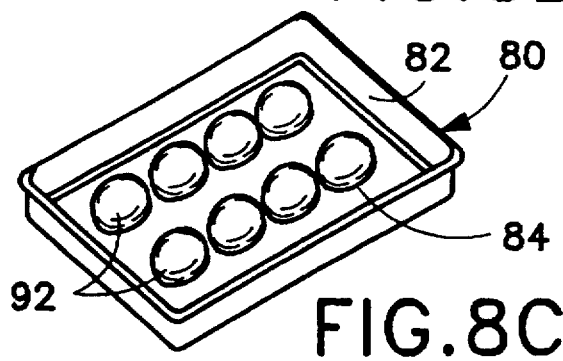
Figure 7D:
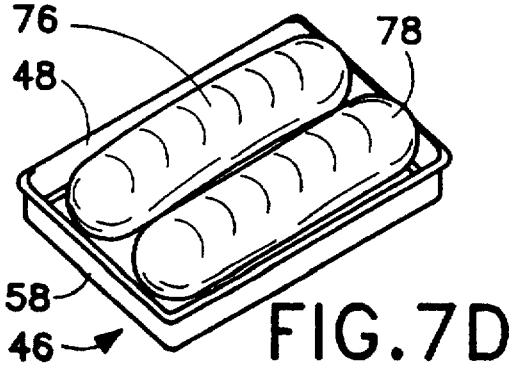

Upon a filling of recesses 60 and 62 with water to predetermined fill levels and upon the optional placement of a flavored composition into recess 64, panels 48 and 58 are connected to one another, as illustrated in FIGS. 7B and 11 to define a steam generation chamber 70 Pieces of dough 72 and 74 are placed on upper surfaces (not designated) of raised portions 50 and 52 so that essentially all perforations 54 and 56 are covered, as indicated in FIG. 7C. Baking then proceeds as discussed above with reference to FIGS. 5A and 5B to produce baked loaves 76 and 78 (FIG. 7D).

Channels 66 and 68 are designed so that vaporized flavor compounds can move from recess 64 to recesses 60 and 62, but the water would not flow from recesses 60 and 62 to recess 64.

The upper and lower panels of a baking pan as described herein should be connected to one another tightly enough so that the steam and vaporized flavor compounds can not escape from the sides. Generally, the right amount of water is automatically controlled by the capacity of the water-receiving recesses or controlled by the use of fill lines.

Figure 8A:
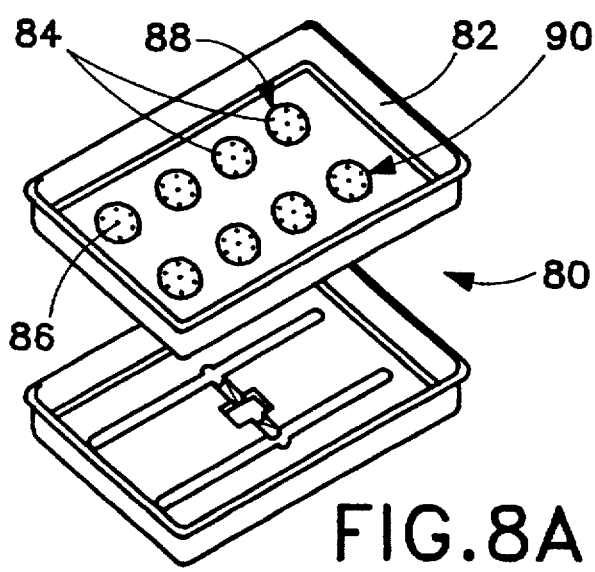
FIGS. 8A-8D show successive steps in the use of yet another baking pan in a baking method in accordance with the invention
Figure 8B:
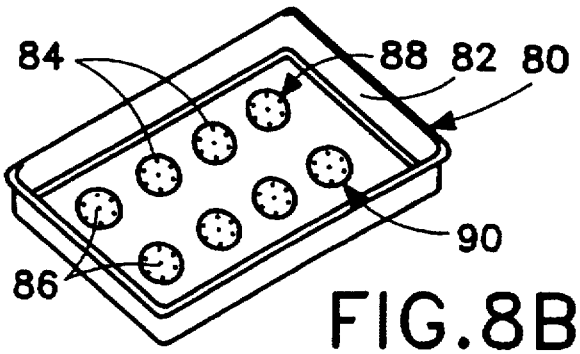
Figure 8D:
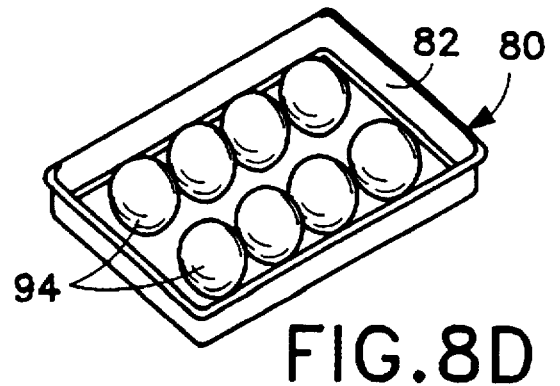
Figure 9:
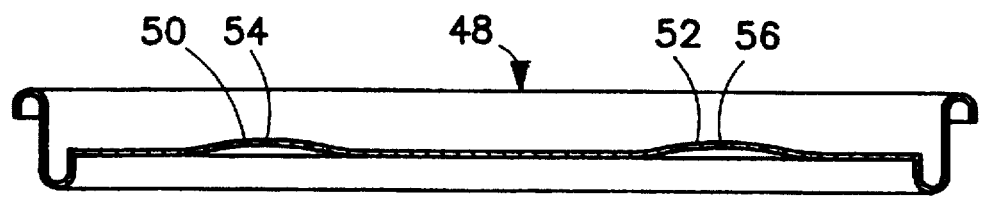
FIG. 9 is a transverse cross-sectional view of an upper panel or plate of the baking pan of FIGS. 7A-7B, taken along a geometric center line.

FIGS. 8A–8B illustrate successive steps in a baking process using yet another baking pan 80. Pan 80 is identical to pan 46 except that upper panel 48 is replaced by a panel 82 having a plurality of circular raised areas 84 provided with perforations 86 and arranged in two linear arrays 88 and 90 over water-receiving recesses 60 and 62. Upon a filling of recesses 60 and 62 with water to predetermined fill levels and upon the optional placement of a flavored composition into recess 64, panels 80 and 58 are connected to one another, as illustrated in FIGS. 8B. Pieces of dough 92 are placed on upper surfaces (not designated) of raised areas 84 so that essentially all perforations 86 are covered. Baking then proceeds as discussed above with reference to FIGS. 5A and 5B to produce baked rolls or buns 94 (FIG. 8D).

Figure 12:
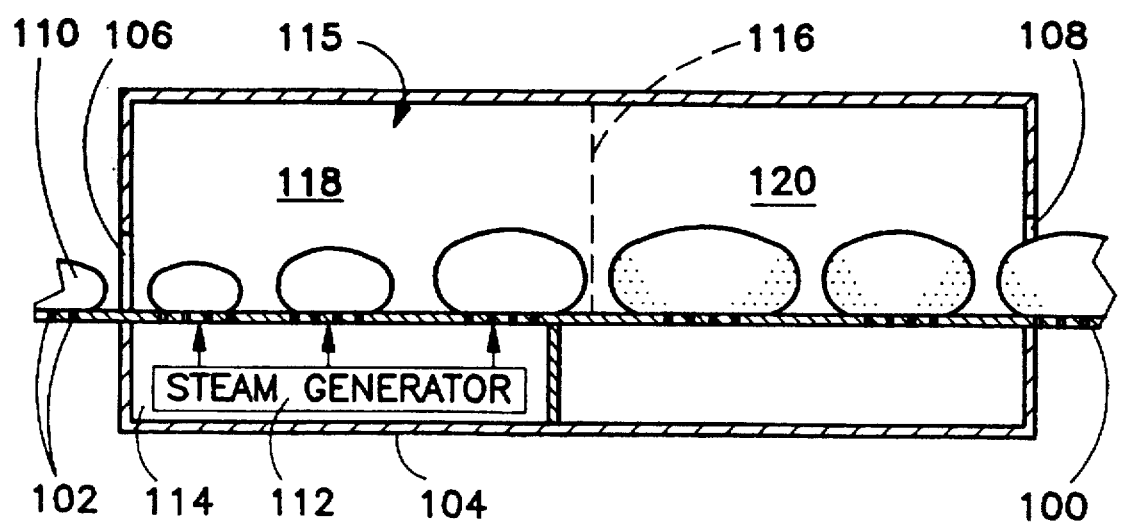
FIG. 12 is a schematic longitudinal cross-sectional view of a continuous-process baking oven in accordance with the invention.

FIG. 12 illustrates it continuous baking process utilizing principles disclosed above with respect to batch type baking processes. A conveyor 100 with a plurality of interspaced arrays of perforations 102 extends through a heat enclosure or oven 104 from an entrance opening 106 to an exit opening 108. Outside of oven 104, pieces of dough 110 are placed on conveyor 100 over each array of perforations 102 so that essentially all the perforations of each array are covered.

Oven 104 is provided with steam generation means 112 in a steam generation chamber 114 below conveyor 100. Chamber 114 extends continuously along a predetermined distance under conveyor 100, generally along approximately the first one-third of he distance between entrance opening 106 and exit opening 108, thereby providing steam to perforations 102 along that stretch of the conveyor. Oven 104 also has at baking chamber 116 defined along a lower boundary by conveyor 100. A compartmentalizer or divider 116 such as a flexible partition is provided for operatively dividing baking chamber 115 into a more humid first baking zone 118 and an essentially dry second baking zone 120 disposed downstream of the first baking zone. Thus, water vapor enters first baking zone 118 by leaking from beneath the dough pieces 110. As discussed above, this leaking water vapor is effective to moisten only the lower portions of the pieces of dough 110. Steam generation means 112 may comprise a series of spray nozzles which eject an aqueous mist into chamber 114 which is sufficiently heated to convert the water spray into steam.

The functions of steam in a baking process as described hereinabove are:

(1) to provide the interior region with a faster heat transfer rate; the interior can be fully gelatinized and expanded before the crust is developed, and therefore, avoiding undercooking of the interior and resulting a high baked specific volume.

(2) to further increase the baked specific volume through the ballooning effect; since the pressure of steam is higher than the atmospheric pressure, the steam would force the dough to expand in every direction besides the bottom due to the unique curvature of the perforated area of the upper pan.

(3) to retain the moisture of the interior region of a baked dough product; due to the continuous evaporation and condensation of the steam, the interior would retain 2–3% higher moisture content than that baked conventionally. The higher moisture content would keep the finished product softer and fresher for a longer period of time.

(4) to avoid overbaking of the bottom crust; due to the continuous flow of steam when there is water remaining in the water channels, the bottom temperature is near 212° F. rather than the oven temperature during the early stage of baking. When the water is completely vaporized, the temperature of the baking pan would reach the oven temperature. The combination of low and high temperatures would allow the development of the desired bottom crust without overheating. When too much water is used, the bottom crust might not be formed properly, it is therefore necessary to adjust the amount of water according to the type and size of a dough product.

(5) to provide more uniform pore size distribution and shape of a finished product, since the gelatinization of the starch is completed before the crust is fully developed, burgeon can be avoided.

Although the invention has been described in terms of particular embodiments and applications, one of ordinary skill in the art, in light of this teachings, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A cooking method comprising;

depositing a piece of dough on a substantially horizontal support surface provided with at least one perforation, said piece of dough covering said perforation;

moving said surface together with said piece of dough into a heated enclosure;

maintaining said surface and said piece of dough in said enclosure for a predetermined period of time;

during at least one portion of said predetermined period, feeding steam through said perforation so that at least some of said steam enters said piece of dough through a lower surface thereof; and during at least another portion of said predetermined period, baking said dough in said enclosure.

2. The method of claim 1 wherein said support surface is provided with a plurality of perforations, said piece of dough being deposited on said support surface so as to cover essentially all of said perforations.

3. The method of claim 2 wherein said support surface is on an upper panel of a baking pan having a substantially sealed chamber communicating with said perforation, further comprising:

placing a predetermined amount of water into said chamber prior to moving said support surface and said piece of dough into said enclosure; and generating said steam from said water after placement of said baking pan and said piece of dough into said enclosure.

4. The method of claim 3, further comprising placing a flavoring composition into said chamber prior to the moving of said support surface and said piece of dough into said enclosure.

5. The method of claim 4 wherein said baking pan is provided in a lower panel with a recess communication with said chamber, said lower panel being disposed substantially opposite said support surface, the placing of said flavoring composition into said chamber being accomplished by placing said flavoring composition in said recess.

6. The method of claim 4 wherein said flavoring composition includes a cooking oil provided with a flavoring component.

7. The method of claim 3 wherein said baking pan is provided in a lower panel with at least one recess communicating with said chamber, said lower panel being disposed substantially opposite said support surface, the placing of water into said chamber being accomplished by placing said predetermined amount of water in said recess.

8. The method of claim 3 wherein said baking pan includes a lower panel disposed substantially opposite said support surface, the placing of water into said chamber including placing said predetermined amount of water onto said lower panel, further comprising connecting said upper panel to said lower panel in a sealed coupling after the placing of said predetermined amount of water onto said lower panel.

9. The method of claim 3 wherein said steam is generated solely by heat in said enclosure.

10. The method of claim 2 wherein said support surface is part of an endless belt, further comprising moving said support surface continuously through said enclosure from an entrance to an exit thereof, said belt dividing said enclosure into an upper chamber and a lower chamber, also comprising generating steam only in said lower chamber.

11. The method of claim 2, further comprising:

permitting water vapor to escape from beneath said piece of dough; and moistening lateral surfaces of said piece of dough with the escaped water vapor.

12. The method of claim 1 wherein said support surface is part of an endless belt, further comprising moving said support surface continuously through said enclosure from and entrance to an exit thereof.

13. The method of claim 1 wherein said another portion of said predetermined period is substantially coextensive with said predetermined period, said one portion having a termination point prior to termination of said predetermined period, steam being fed through said perforation only during said one portion of said predetermined period.

14. The method of claim 1 wherein said enclosure is an oven, further comprising preheating said oven prior to moving said support surface together with said piece of dough into said oven.

15. A baking pan for use in cooking a food article with a lower surface having a general predetermined size and shape said baking pan comprising:

an upper panel defining a substantially horizontal support surface, said upper panel being provided with a plurality of perforations disposed in an array covering only a portion of said support surface, said array substantially conforming in size and shape to the size and shape of the lower surface of the food article, whereby the food article covers substantially all of said perforations upon being placed on said support surface over said array;

a lower panel, and means for releasably and sealingly coupling said upper panel and said lower panel to one another so as to define a chamber therebetween, said lower panel being provided with a recess communicating with said chamber said perforations communicating with said chamber.

16. The baking pan of claim 15 wherein said support surface includes a raised portion, said perforations being disposed in said raised portion.

17. The baking pan of claim 16 wherein said raised portion includes a central depression, said perforations being disposed in said depression of said raised portion.

18. The baking pan of claim 15 wherein the food article is a loaf-shaped piece of dough, said array having an elongate shape approximating the lower surface of the loaf-shaped piece of bread in size and shape.

19. The baking pan of claim 15 wherein said recess is laterally spaced from said array, said upper panel and said lower panel defining said chamber to include a channel between said recess and said array.

20. A cooking method comprising:

providing a baking pan with a substantially sealed internal chamber, said baking pan having an upper support surface with a plurality of perforations disposed in an array covering only a portion of said support surface, said perforations communicating with said chamber;

disposing a predetermined amount of water in said chamber;

disposing a food article on said support surface over said perforations;

moving said baking pan together with said food article into a heated enclosure;

maintaining said baking pan and said food article in said enclosure for a predetermined period of time;

during one portion of said period of time, generating steam from the water in said chamber and allowing said steam to escape said chamber through said perforations, said portion of said period of time being significantly shorter in duration than said period of time; and during another portion of said period of time subsequent to said one portion, subjecting said food article to conventional baking only.

21. The method of claim 20 wherein said food article covers essentially all of said perforations, said steam penetrating said food product after escape of said steam through said perforations.

22. The method of claim 20 wherein said baking pan is provided in a lower panel with at least one recess communicating with said chamber, said lower panel being disposed substantially opposite said support surface, the placing of water into said chamber being accomplished by placing said predetermined amount of water in said recess.

23. The method of claim 20, further comprising subjecting said food article to baking during said one portion of said period of time, said one portion of said period of time having a termination point prior to termination of said period of time.

24. The method of claim 20 wherein said enclosure is an oven, further comprising preheating said oven prior to moving said baking pan together with said food article into said oven.

25. The method of claim 20, further comprising placing a flavoring composition into said chamber prior to the moving of said baking pan together with said food article into said heated enclosure.

26. A cooking method comprising:

placing a food article in a heated enclosure, after placement of said food article in said heated enclosure, delivering a controlled amount of steam to said food article for one limited period of time; and upon completion of the delivery of steam to said food article, subjecting said food article only to conventional baking for another limited period of time.

27. The method of claim 26 wherein said steam is delivered into said food article through a lower surface thereof.

28. The method of claim 26, further comprising subjecting said food article also to baking during said one limited period of time.

29. The method of claim 26 wherein said enclosure is an oven, further comprising preheating said oven prior to placement of said food article into said oven.

30. The method of claim 26, further comprising subjecting an upper portion of said food article to conventional dry baking heat while steam is applied to a lower portion of said food article during said one limited period of time.

* * * * *